(12) United States Patent
Hood

(10) Patent No.: US 12,505,397 B2
(45) Date of Patent: Dec. 23, 2025

(54) METHODS AND APPARATUS FOR NATURAL LANGUAGE PROCESSING AND GOVERNANCE

(71) Applicant: Theia Analytics Group Inc., Washington, DC (US)

(72) Inventor: Jeffrey J Hood, Washington, DC (US)

(73) Assignee: Theia Analytics Group Inc., Washington, DC (US)

( * ) Notice: Subject to any disclaimer, the term of this patent is extended or adjusted under 35 U.S.C. 154(b) by 5 days.

(21) Appl. No.: 17/933,437

(22) Filed: Sep. 19, 2022

(65) Prior Publication Data

US 2023/0342693 A1   Oct. 26, 2023

Related U.S. Application Data

(60) Provisional application No. 63/295,281, filed on Dec. 30, 2021.

(51) Int. Cl.
| | |
|---|---|
| *G06Q 10/00* | (2023.01) |
| *G06F 40/00* | (2020.01) |
| *G06F 40/211* | (2020.01) |
| *G06F 40/30* | (2020.01) |

(Continued)

(52) U.S. Cl.
CPC ....... *G06Q 10/0635* (2013.01); *G06F 40/211* (2020.01); *G06F 40/30* (2020.01); *G06F 40/40* (2020.01)

(58) Field of Classification Search
CPC .................................................. G06Q 10/0635
See application file for complete search history.

(56) References Cited

U.S. PATENT DOCUMENTS 11,042,709 B1 * 6/2021 Pham ..................... G06F 40/295
11,321,538 B1 * 5/2022 Fontecilla ............... G06F 40/40
(Continued)

OTHER PUBLICATIONS

D. Subramanian, D. Bhattachrajya, R. R. Torrado, J. Kephart, V. Chenthamarakshan and J. Rios, "A cognitive assistant for risk identification and modeling," 2017 IEEE International Conference on Big Data (Big Data), Boston, MA, USA, 2017, pp. 1570-1579, doi: 10.1109/BigData.2017.8258091. (Year: 2017).*

*Primary Examiner* — Matheus Ribeiro Stivaletti
(74) *Attorney, Agent, or Firm* — Jon E. Gordon; Haug Partners LLP

(57) ABSTRACT

Embodiments are directed to computer-implemented methods of governance risk analysis and scoring of documents that includes: extracting raw text from documents; transforming individual words from the raw text into nodes and edges that create networks of nodes and edges; analyzing certain words pertaining to governance, and graphing the words to a network of nodes and edges; assessing the certain words in the network using mathematics, graph theory, or NLP; determining a semantic score for each node using the number and weight of edges surrounding each node; determining a saliency score based on a word's reoccurrence in the raw text; determining a risk sentiment score determined by the seed dictionary with the list of words exhibiting risk; determining a node score for a certain node based on the semantic score, the saliency score, and the risk sentiment score; and iterating the scores automatically every time a new filing is uploaded.

19 Claims, 8 Drawing Sheets

(51) Int. Cl.
  *G06F 40/40* (2020.01)
  *G06Q 10/0635* (2023.01)

(56) References Cited

U.S. PATENT DOCUMENTS

2018/0197128 A1* 7/2018 Carstens ............. G06F 16/9024
2023/0136972 A1* 5/2023 Appel ................. G06Q 10/067
                                                          705/35

* cited by examiner

METHODS AND APPARATUS FOR NATURAL LANGUAGE PROCESSING AND GOVERNANCE

BACKGROUND

Some embodiments are directed to methods and apparatus for natural language processing and governance, such as in the context of government regulatory filings/documents, including but not limited to the Securities and Exchange Commission. However, embodiments are intended to be applicable in completely different contexts.

Numerous institutions, such as the Sustainability Accounting Standards Board (SASB), the Financial Industry Regulatory Authority (FINRA), the Global Reporting Initiative (GRI), the Task Force on Climate-Related Financial Disclosures (TCFD), and the U.S. Securities and Exchange Commission (SEC) form standards for environmental, social, and governance (ESG) issues.

SUMMARY

This standard activity has propelled entities to seek resources for ESG compliance. However, the ESG marketplace is focused on environmental and social data and analytics, neglecting governance analytics. As the world of governance and risk management continues to transform, no sufficient governance-focused analytics exist to inform companies about their governance-focused management (the G of ESG). Thus, it may be beneficial to inform companies about their governance-focused management (the G of ESG).

Thus, some embodiments are directed to deeply quantitative analytics techniques to present external assurances for companies to take advantage of an outside-in view of governance management practices. The existing solutions in the market do not feature automated methods utilizing a combination of Natural Language Processing to drive a Scoring Process and benchmarking, which are disadvantages that the presently disclosed subject matter overcomes.

Some embodiments may be a website to determine governance risk from which a company representative can log in and attain Risk Quotients or Risk Scores for publicly available companies of various industries and can compare these quotients/scores with their own company in terms of time, market cap, Influence Spend, change in Risk Quotient, change in various documents over time, and through comparison to other key companies and industry trends.

Some embodiments are related to an implemented algorithm to provide a Scoring Process and benchmarks for companies on their ES(G) management that provide meaningful decision-making insights, including collecting data from the federal register and other sources that include publicly disclosed files for publicly traded companies; identifying risks; controlling the risks along relevant sector, industry, and sub-industry; and analyzing unstructured input data using neural network models and iterative graph construction to create unique company risk quotients/risk scores.

Some embodiments may contain computation methods that involve a novel algorithm to process qualitative text data into a quantitative dynamic risk quotient/score for each company. In some embodiments, the risk quotient/score that may be computed will contain base risk associated with the sector that the company operates in. Specifically, the industries are currently made up of, but not limited to, eleven (11) sectors identified by the SASB: Consumer Goods, Extractives & Minerals Processing, Financials, Food & Beverage, Health Care, Infrastructure, Renewable Resources & Alternative Energy, Resource Transformation, Services, Technology & Communications, and Transportation and seventy-seven (77) industries also identified by the SASB. All other public sectors may also be covered, such as the 11 sectors listed by the S&P and the 11 sectors listed by GICS, The analysis may include taking the given words within key documents around governance and graphing them through a network of nodes and edges. These are then assessed to determine the semantic and syntactic relationships between words. In doing so, through mathematics, graph theory, and Natural Language Processing, the program may be able to determine key information from the document, such as specific elements of density and rhetoric, which can be used to determine governance and regulatory risk.

The analysis may include evaluating the Influence Spend of companies. By using a predictive model, Influence Spend is estimated via Risk Quotient, market cap, industry, years active, and prior cycle spending. The model used is a tree-based model that scales partial cycles using linear adjustments to extrapolate entire election cycles. After the Influence Spend of a given election cycle is determined, a residual is formed through the difference between prediction and actual. These are scaled according to custom fit mean, and standard deviation; these residuals are either scaled or have their absolute value taken to form a Spending Quotient.

During a document analysis, in no specific order, stock words may be removed, sentences may be lemmatized, and sentences may be split from one another to form nodes. After doing so, Corpus Graphs may be formed by creating a semantic score, saliency score, and sentiment score to capture complex relations and key features of the word usage and form data to a score for each document, company, and industry called a Risk Quotient. The Risk Quotient may come in the form of a number falling in the range of 0 to 100, with 0 being high risk and 100 being low risk.

The analysis may generate action items for each company by utilizing pattern analysis to find solutions for complex problems by taking advantage of historical data and examples. During this analysis, the algorithm may utilize pattern analysis to predict the regulatory behavior of federal agencies and customize action items for each company accordingly.

Some of the preferred embodiments (identified here as RRA) can be described as a proprietary Scoring Algorithm based on governance and ES(G) management practices of publicly traded and soon-to-be publicly traded companies.

The Scoring Algorithm may be used to identify high-risk companies by the density of their risk statements in their publicly available filings and their ability to address those concerns using publicly available spending data. The computation method is based on utilizing Natural Language Processing, modern graph theory and a novel algorithm to convert the qualitative text data into a company quantitative risk quotient/score while factoring in the industry the company operates within and correlated spending to mitigate those defined risks.

Key findings from the analysis may be presented to the client through various figures, graphs, and diagrams on the website dashboard.

Thus, some embodiments are directed to a computer-implemented method of governance and regulatory risk analysis and scoring of documents relating to companies in an industry, the documents containing raw text including words pertaining to governance, the method being useable with a seed dictionary containing a list of words exhibiting risk. Some of the methods include: extracting the raw text from the documents; transforming individual words from the raw text into nodes and edges that create networks of nodes and edges, one of the networks of nodes and edges pertaining to each document; analyzing, in the documents, certain words pertaining to governance and graphing the words to the network of nodes and edges; assessing, to determine a semantic and syntactic relationship, the certain words in the network using at least one of mathematics, graph theory, and Natural Language Processing (NLP); determining a semantic score for each node using the number and weight of edges surrounding each node; determining a saliency score based on at least a reoccurrence in the raw text; determining a risk sentiment score determined by the seed dictionary with the list of words exhibiting risk, the score being affected by the connectedness of the document to the words exhibiting risk; determining a node score for a certain node based on the semantic score, the saliency score, and the risk sentiment score; and iterating at least one of the semantic score, the saliency score, the risk sentiment score, and the node score automatically every time there is a new filing uploaded.

In some of these embodiments, the raw text includes words and sentences.

Some of these embodiments further include: removing stock words from the raw text; lemmatizing at least one of the words and sentences to remove proper nouns, punctuation, and correct spelling; and separating sentences from one another.

In some of these embodiments, the method is useable on the internet, and the raw text from filings pertains to public information available on the internet.

In some of these embodiments, the raw text from filings pertains to public SEC filings.

In some of these embodiments, the scores are reflected to contextualize risk on a scale.

In some of these embodiments, the method includes at least one client and sends at least one of the semantic scores, the saliency scores, risk sentiment scores, and the node scores to at least one client.

In some of these embodiments, the nodes are expressed as vectors using Law2Vec analysis to choose a vector that represents a word portrayed in a specific node.

In some of these embodiments, the semantic score is calculated using a modified version of PageRank.

In some of these embodiments, a sentence-level risk score is determined based on the risk score of the words in the sentence.

In some of these embodiments, a document-level risk score is determined based on the risk score of the sentences in the document.

In some of these embodiments, the method is repeated until every filing for a company has been given a measure of governance and regulatory risk.

In some of these embodiments, a company risk quotient is formed using the risk quotients of the documents pertaining to that company.

In some of these embodiments, a sector risk quotient is formed using the risk quotients of individual companies pertaining to that sector.

In some of these embodiments, a modified exponential decay algorithm is used to weigh the documents by relevance according to time.

DETAILED DESCRIPTION OF EXEMPLARY EMBODIMENTS

The figures are described below. Before the embodiments are to be explained in detail, it is to be understood that the presently disclosed subject matter is not limited in application or process to the details stated, as there are other embodiments and methods of carrying out and practicing the presently disclosed subject matter than those described. As such, the language used below is not limiting and states what may be used but may not necessarily be completely exhaustive.

Figure 1:
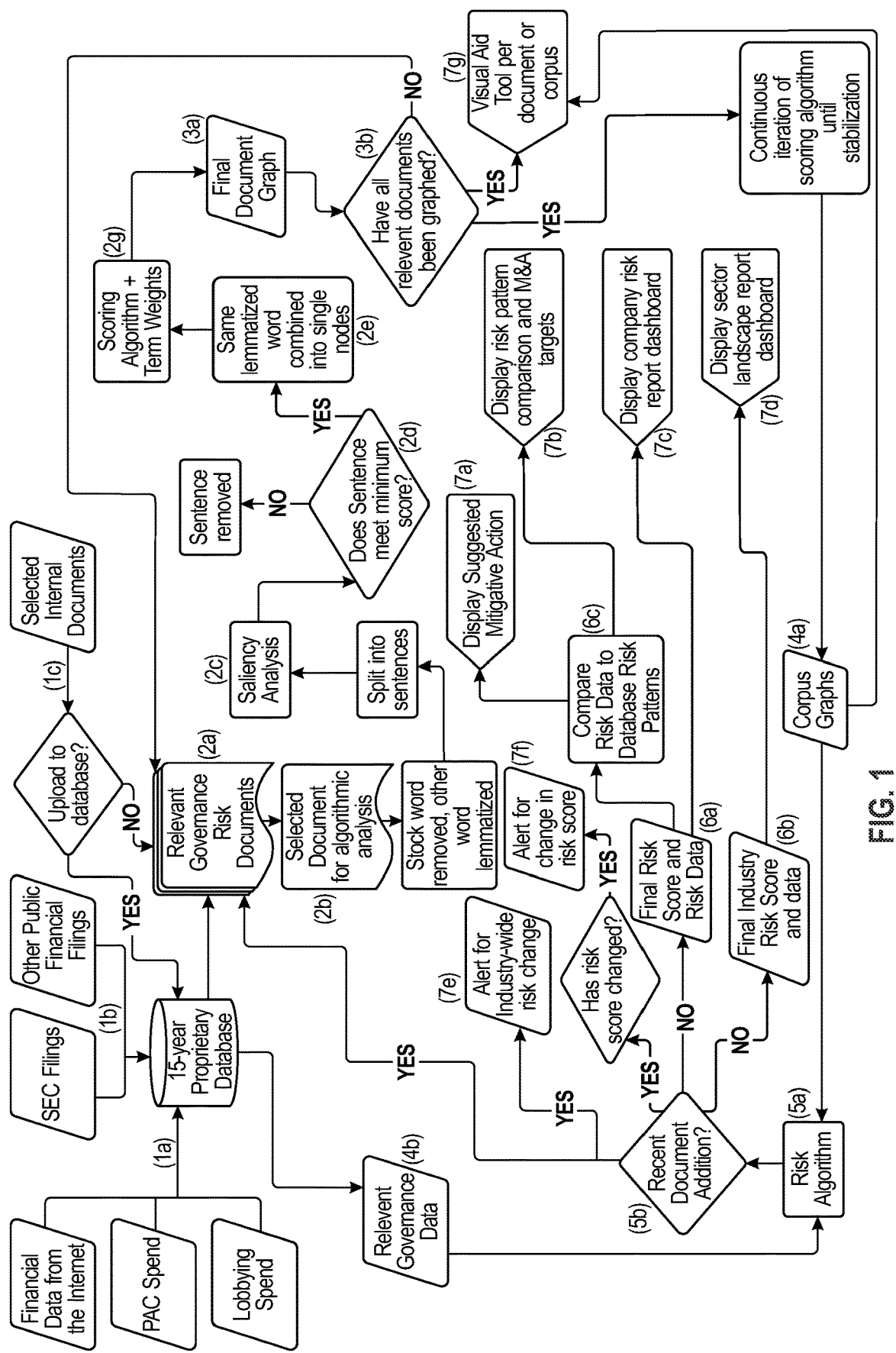
FIG. 1: shows the Scoring Process by which a score is determined for documents, companies, and industries, and information is delivered to the client.

Exemplary features and implementing technologies are disclosed below.
I. Scoring Process
II. Scoring Algorithm
III. Risk Algorithm
IV. The Website and Risk Analysis Dashboards
V. Other Exemplary Features
I. Scoring Process FIG. 1 consists of a flowchart showing the operation of the Scoring Process. The company has defined a key unique algorithmic form of analysis utilizing an ontological conception of analysis, taking advantage of an ability to form a comprehensive Saliency Score, Sentiment Score, and Semantic Score that is used to create Corpus Graphs, which are combined with a predictive, trained model formed via alternative documents. This allows for a unique formulation that can be applied to various industries, concepts, documents, sentences, words, or nodes to form a quantitative understanding and analysis of governance.

Documents from the internet, PAC spending, lobbying spending (1a), SEC filings, other public financial filings (1b), and selected internal documents uploaded to the database (1c) are aggregated to create the Proprietary Database.

Relevant governance risk documents (2a) may consist of the data from the Proprietary Database and non-uploaded select internal documents. A selected document is taken for analysis (2b), stock words are removed, and the rest of the words are lemmatized and split by sentences.

Sentences go through Saliency Analysis (2c) to determine whether the sentence is significant within the document. Saliency Analysis may consist of taking the nodes in the adjacency matrix and iteratively applying the modified PageRank Algorithm to them with the edge weights and testing if the difference between the current and last quotient is under the specified tolerance. For more details, see FIG. 2. If the Saliency Analysis finds the sentence valued under a minimum score, then the sentence is removed (2d). The same lemmatized words in the remaining sentences are then combined into single nodes (2e) for the Scoring Algorithm.

The document is then weighted using a Scoring Algorithm that uses mathematics, graph theory, and Natural Language Processing principles (2g). Each term is weighted based on frequency using the formula TW−ICW(t,D)=TW(t,D)×log(ICW(t,D)). Further details on the Scoring Algorithm are provided in FIG. 2. This is compiled into the final document graph (3a).

If relevant documents fail to be graphed, they will not be scored and an attempt to re-graph will be made in the next run of the algorithm. If the graphing process is successful, the graph is added to the Corpus Graphs (4a) and the Scoring Algorithm begins. The complete final document will serve as a visual aid (7g).

The Risk Algorithm may be applied to Corpus Graphs (5a) and relevant governance data from the Proprietary Database (4b). The Risk Algorithm may consist of taking the Corpus Graphs and relevant governance data and applying the corpus weighting formula and the financial risk score weighting formula, respectively, before using the risk score weighting formula on those results. This calculates the risk score of the company, as illustrated further in FIG. 3.

If document additions exist, add them to the relevant governance risk documents; the program may set an alert for industry-wide risk change (7e) or may set an alert if there has been a change in the risk score from the new document additions (7f).

If no recent documents have been filed (5b), the program may determine the final risk score and risk data for the industry (6b). The program may then use this to display the Industry Summary Dashboard (7d). For more information, see FIGS. 7 & 8.

If no recent documents have been filed (5b), then the program may determine the final risk score and risk data (6a). The program may then display the Company Dashboard visualizing the risk report for the consumer (7c). For more information, see FIGS. 4 & 5.

The program may then compare the risk data to database risk patterns (6c). Afterward, the program may use this comparison to display both suggested mitigative actions (7a), risk pattern comparisons, and M&A targets (7b).

II. Scoring Algorithm

Figure 2:
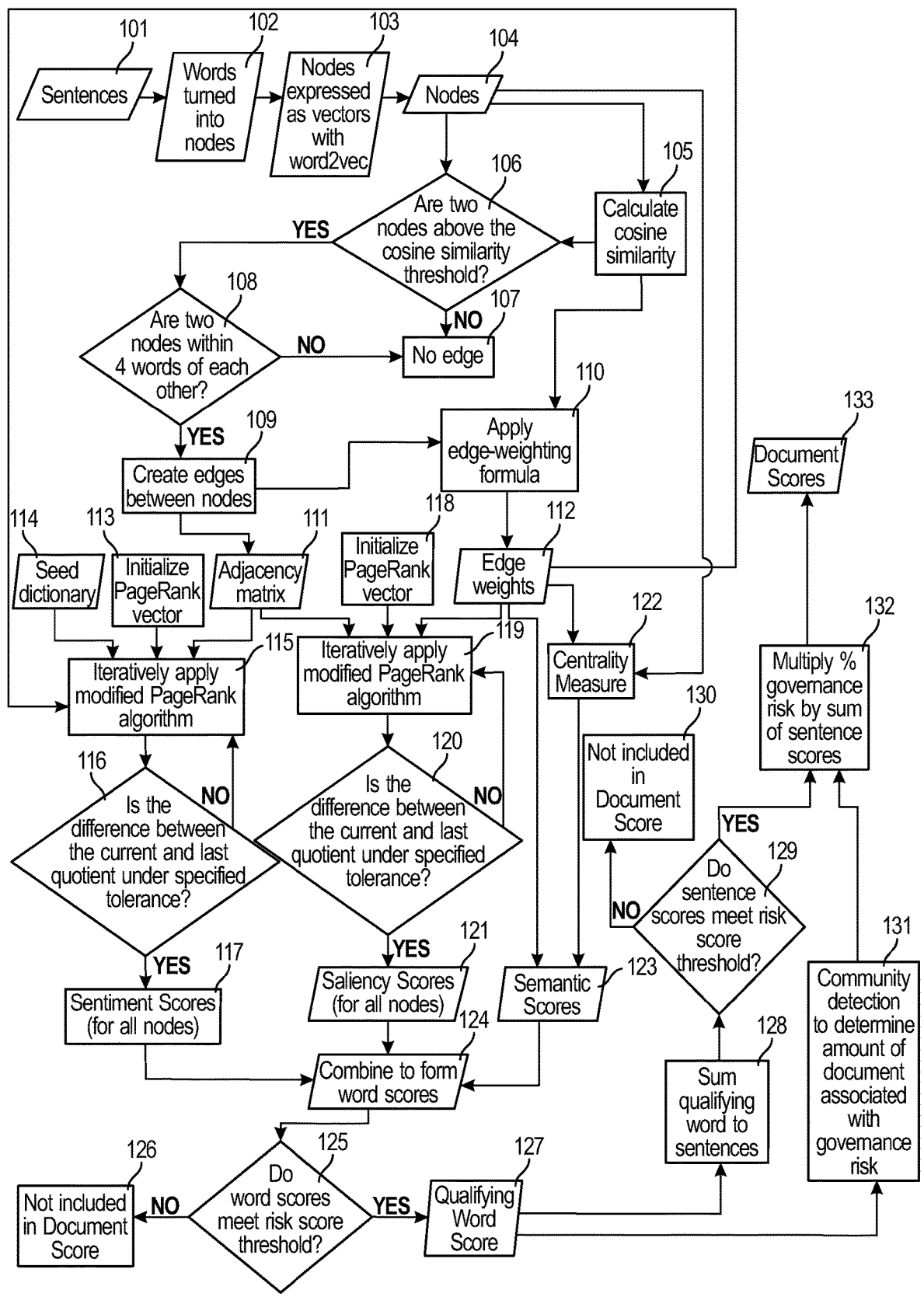
FIG. 2: shows the process the Scoring Algorithm uses to form a quantitative analysis of documents around governance compliance.

FIG. 2 depicts the Scoring Algorithm. The Scoring Algorithm is the algorithm used to form the key Risk Quotient. The Risk Quotient is the 0 to 100 score that constitutes the current main metric used to demonstrate the degree of Governance Risk that is projected for various clients.

The first step in using the Scoring Algorithm may consist of turning sentences (101) into words, then nodes (102), then expressing those nodes as vectors (103).

The word vector embeddings (104) are used to calculate the cosine similarity between nodes (105). Any pair of nodes that are calculated to be above the cosine similarity threshold (106) and within four words of each other (108), get an edge (109). This is used to determine which words affect each other and create an impact. This determines the adjacency matrix (109).

Cosine similarity is finding the cosine of two angles in order to determine a number that lies between −1 and 1 using the formula $\cos(\theta)=(A \cdot B)/(\|A\|*\|B\|)$. In Natural Language Processing, this calculation determines the relation of terms and is used to find key similarities between words.

Word-to-vector embedding is the process of using a database to turn words into vectors. The embedding may consist of either an internally created database for word-to-vector embedding or an external source such as Law2Vec. Words with similar characteristics will have similar values within the vector, creating a complex, nuanced perspective on language that allows for many varying factors to be weighed against one another according to how they are typically used within sources of writing. Law2Vec, for example, examines how words are used in relation to one another in legal writing and then converts them to vectors that capture this relation. In certain embodiments, the database for embedding can be varied and changed according to what leads to the most accurate word analysis for the sake of governance.

Edge weights (112) are formed using an edge-weighting formula (110), specifically w(word1,word2)=sim(word1,word2)/(1+d(word1,word2)). The adjacency matrix (111), the edge weights (112), and the initialized PageRank Vector (118) have an iterative PageRank Algorithm, $PRV^{(t+1)}=\beta A \cdot PRV^{(t)}+(1-\beta)s_{eq}$, applied (119) that continues until the difference in the current and last quotient is under a specified tolerance (120) to form a Saliency Score for all or most nodes (121).

In some embodiments, some words that may appear very salient might not clarify the subtle signals in a text that the algorithm intends to capture. This may especially be the case if the words appear too frequently in a corpus; these words are likely the subjects of the text and are not necessarily providing a meaningful contribution to the overall sentiment of the text. The algorithm reconciles this difficulty by studying term weighting schemes. In Natural Language Processing, word weighting schemes are used to weigh the frequency of words within a document (concerning their frequency within an entire corpus). Specifically, in a corpus full of 10-Ks and 10-Qs, the word "financial" is likely to appear frequently. While the word has significant semantic meaning, its presence in a document, unless accompanied by other noteworthy terms, is not notable. As such, this provides the intuition behind many term weighting schemes used in the Natural Language Processing space. Term t appearing in document d should get a high weight if the term frequently appears in d, but infrequently in corpus D.

PageRank Algorithm is an algorithm used by Google to rank web pages for search engine results. It operates by counting the number and quality of links assuming that more valuable websites will receive more links from other highly valued websites. Specifically, PageRank Algorithm forms a probability distribution over web pages, so the sum of ranks over all websites is unity. As such, the algorithm assumes web surfers jump randomly, making the page ranks calculated via an iterative algorithm corresponding to principal eigenvectors of a normalized link matrix of the web. This is accomplished by successively applying the following equation: $PRV^{(t+1)}=\beta A \cdot PRV^{(t)}+(1-\beta)_{Seq}$. Where $\beta$ is the non-teleportation parameter (namely, the probability that a random walker on our graph decides not to teleport to a non-adjacent node) and seq is the vector of probabilities of transporting to a specific node once the random walker decides to teleport.

A similar formula is applied between the adjacency matrix (111), the seed dictionary (114), and an initialized PageRank vector (113). Again the modified PageRank Algorithm, $PRV^{(t+1)}=\beta A \cdot PRV^{(t)}+(1-\beta)_{seq}$ is applied (115) until the difference between the current and last vector is under a specified tolerance (116) to form a Sentiment Score for all or most nodes (117). This Sentiment Score may determine the specific sentiment and complex fundamental understanding of words to incorporate not only the relative importance and syntax of words but also the content behind the words.

The Semantics Score for each word in each document is relative to its importance to other documents, which can also be described via edge weights or the distance of that node to others. For example, regarding the code, given any sentence in a document, the code will model it as a graph by assigning a node (104) to each word and connecting two nodes by an edge (112) if the words appear within four words of each other (108) and reach a minimum threshold for cosine similarity (106), a measure of semantic similarity. As such, the program measures the centrality of words in the document and uses this Centrality Measure (122) to determine the final Semantics Score (123).

The Saliency Score (121), Sentiment Score (117), and Semantics Scores (123) are combined into Word Scores (124).

If a Word Score meets the risk threshold (125), then it is included in the document score (127). Community detection is used to determine the amount of the document associated with governmental risk (131).

Community detection algorithms are used to group "communities" within nodes that have similar properties and are more tightly connected.

Qualifying words to sentences are summed (128). If they meet the Risk Threshold, then they are included in the document score (129).

The % of governance risk is multiplied by the sum of the qualifying sentence scores (132) to form a final Risk Quotient (133).

III. Risk Algorithm

Figure 3:
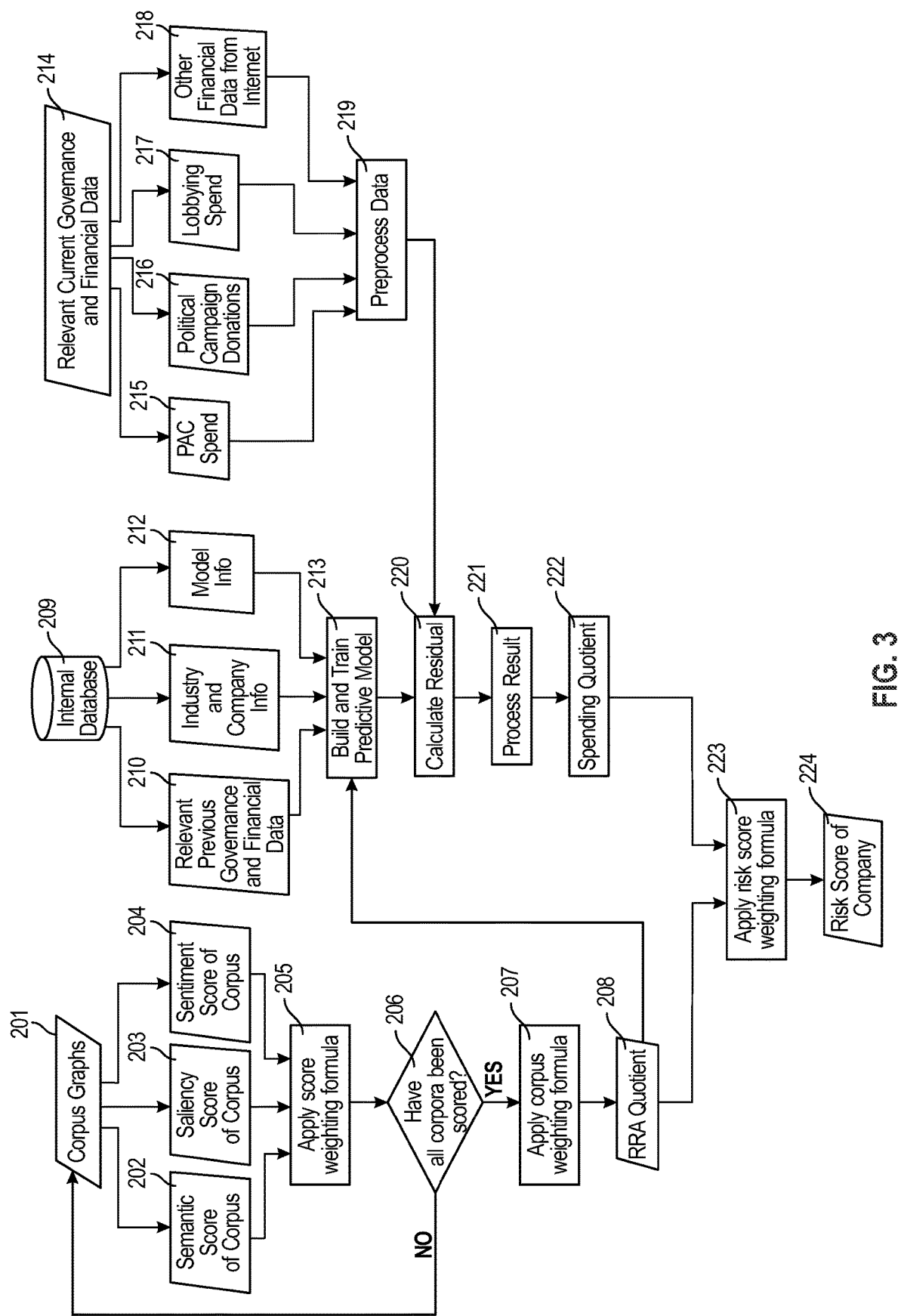
FIG. 3: shows the Risk Algorithm used to scale expected and actual risk in the document.

FIG. 3 shows the process for creating the more advanced risk scores. The process may involve gathering data from the Corpus Graphs (201), Internal Databases (209), and relevant governance and financial data (214) and applying predictive models and formulas to calculate an appropriate risk score.

The nodes in each Corpus Graph (201) get a Semantic Score (202), Saliency Score (203), Sentiment Score (204), and the score weighting formula is applied to the three (205). This is repeated until all Corpora have been scored (206), then a corpus weighting formula is applied (207) to make the Risk Quotient (208). Again, this allows for a nuanced perspective that takes into mind the relative importance, syntactic relation, and deeper meaning between words. More details of the entirety of this process are supplied in FIG. 2 and its corresponding Scoring Algorithm detailed description.

Information from the Internal Database (209) may consist of relevant previous governance and financial data (210), industry and company information (211), and model information (212).

This data may then be used to train and build a predictive model of Influence Spend (213). This is done via a predictive, tree-based model scaling value for partial cycles using linear transformations to extrapolate and predict Influence Spend for an entire election cycle.

Data from relevant governance and financial data (214) may incorporate PAC spending (215), political campaign donations (216), lobbying spending (217), and other financial data gathered from the internet (218).

The data may then be preprocessed (219) to form a predicted Influence Spend for a cycle to compare with the predicted spend from the Internal Database.

After this is done, a residual may be calculated between predicted and actual using the data from both the Internal Database and relevant current governance and financial data (220). Positive residuals mean less is being spent than expected, while negative residuals mean more is being spent.

The residual may then be scaled with a distribution, usually normal, with a custom fit mean and standard deviation (221) to create the Spending Quotient (222). The Spending Quotient can be either scaled or absolute valued depending upon the circumstance, industry, subindustry, geography, company size, company market cap, company age, or any other category that it may be necessary to vary the data around.

The Spending Quotient may then be displayed in the RRA app colored according to risk via a green to yellow to red based on the determined risk the company is facing.

The Spending quotient and Risk Quotient may be taken, and a risk score weighting formula may be applied (223) to form a final risk score for the company (224).

IV. The Website and Risk Analysis Dashboards

Figure 4:
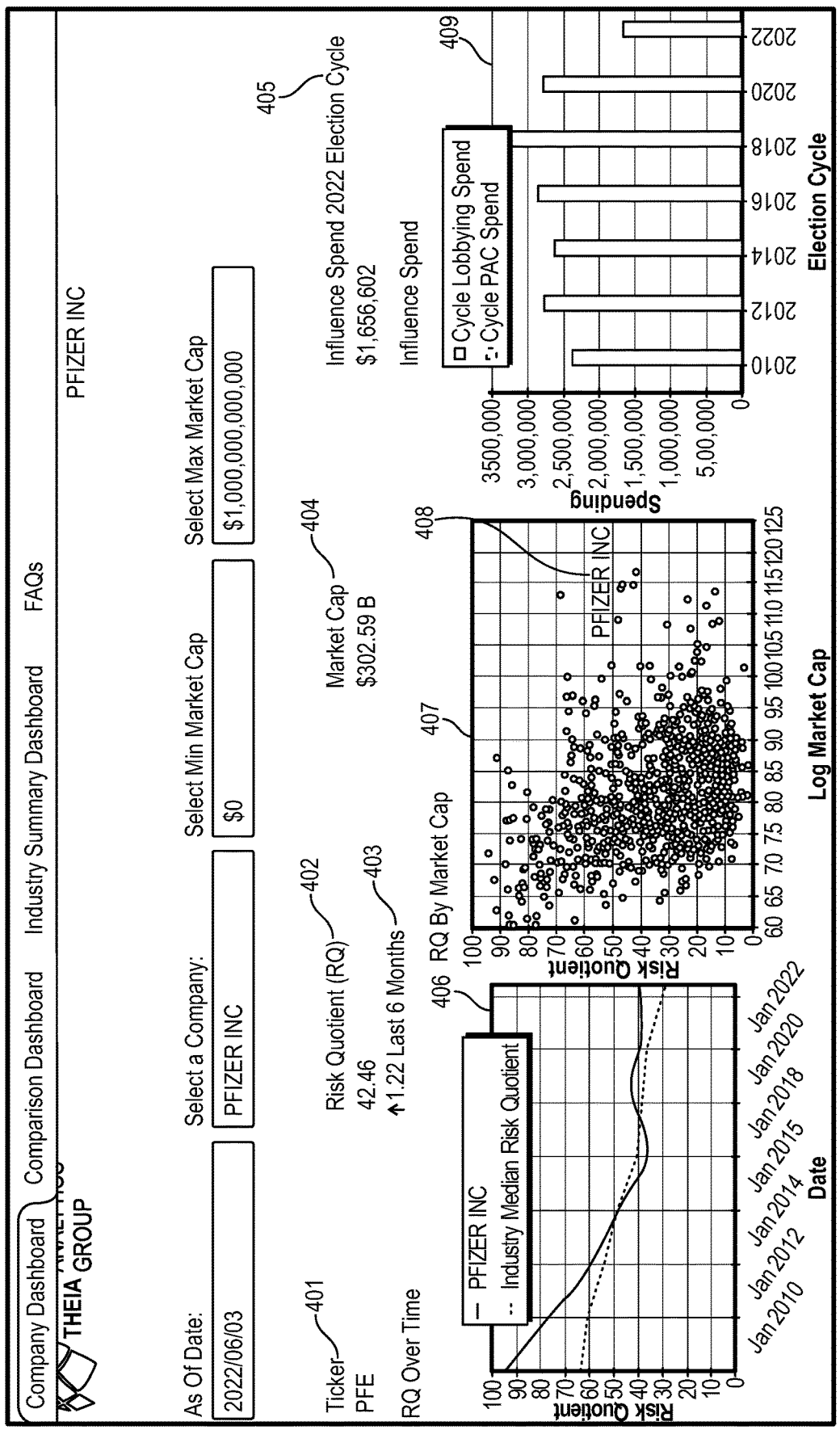
FIG. 4: shows the Company Dashboard key Risk Quotient graphs and data output.

FIG. 4 displays the Company Dashboard. This dashboard allows an analysis of a company, starting at a date, for a certain market cap range. The information provided about the company may include the ticker (401), the Risk Quotient (402), changes in Risk Quotients in either green or red, along with an arrow to demonstrate direction over the last six months (403), the market cap (404), and the Influence Spend in the elected election cycle (405). The user has the option to filter companies based on sector, industry, market cap, or date in time.

Included with this information may be three separate graphs, the first being a Risk Quotient change over time graph that compares the company with the industry median Risk Quotient over time (406). Another graph will have the Risk Quotient of companies in the industry compared to the log market cap (407), with the company in question visible with a different color and name identifier (408). The final graph will be an Influence Spend graph comparing spending with the election cycle across cycle lobbying spend and Cycle PAC Spend (409).

Figure 5:
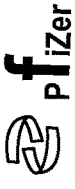
FIG. 5: displays the Company Dashboard charts comparing iterations of various publicly disclosed documents and a document viewer.

FIG. 5 shows another part of the Company Dashboard, which has a table displaying recent documents of the Company in question alongside the Risk Quotients of the documents (501). These Risk Quotients may be accompanied by a color corresponding to the strength of the 'document's Risk Quotient, and a gradational key demonstrates how the colors are assigned to each number (502). Green means the document has a high Risk Quotient, yellow means the Risk Quotient is in the middle, and red means there is a low Risk Quotient. The table also includes the date and document type with a drop-down menu offering to switch between document types (503). Document types offered may include but not be limited to 10-K, 10-Q, 8-K, and 14A. A document viewer (504) is provided to easily look through documents to try to determine the causes of a document's specific Risk Quotient.

Figure 6:
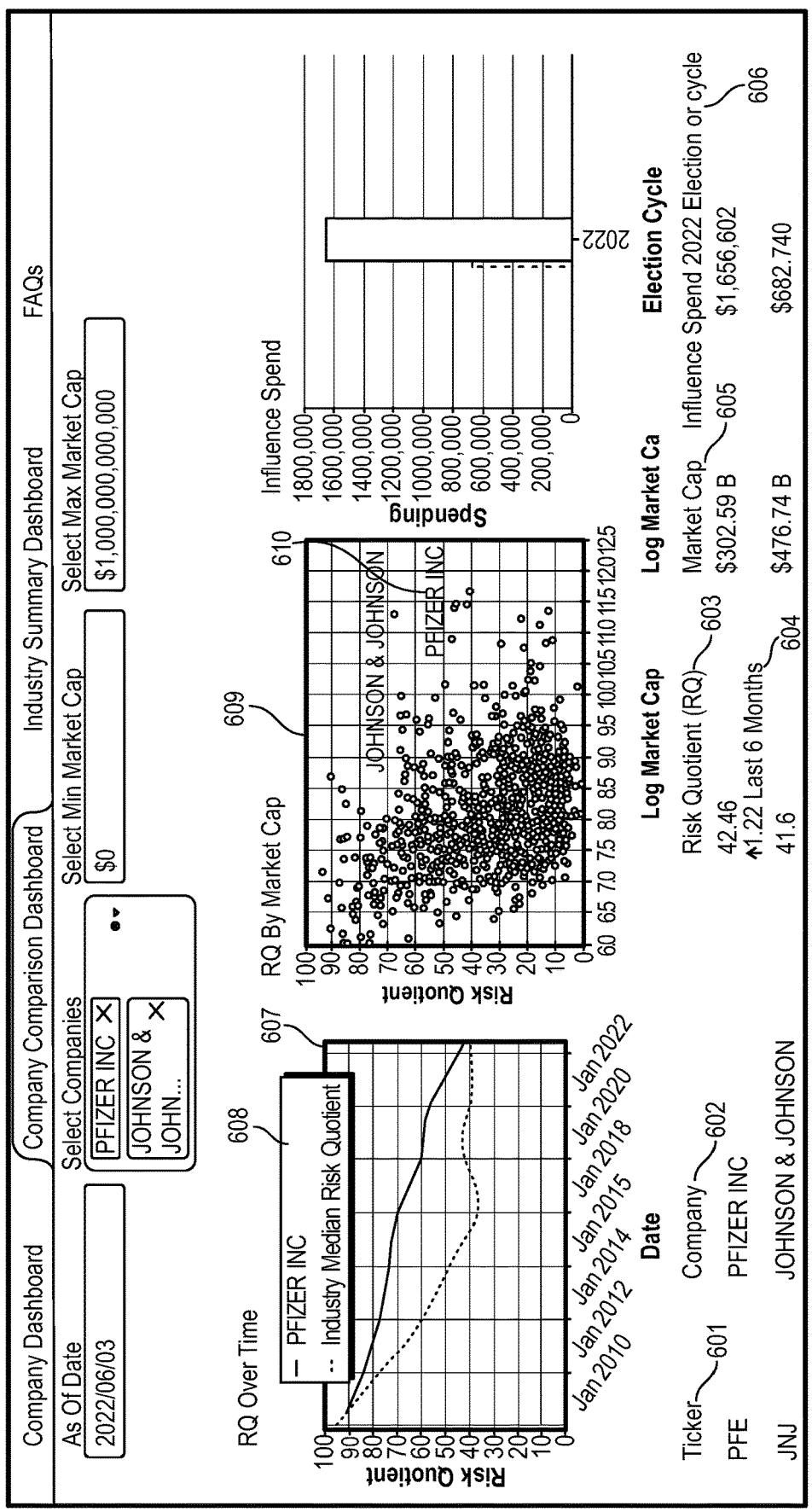
FIG. 6: displays the Company Comparison Dashboard charts comparing Risk Quotient graphs and data outputs of several companies simultaneously.

FIG. 6 shows the Company Comparison Dashboard, which displays the tickers (601), company names (602), Risk Quotients (603), and changes in Risk Quotients in either green or red, along with an arrow to demonstrate direction over the last six months (604), market caps (605), and Influence Spends (606) in the most recent election cycle for multiple companies simultaneously. Above this data are three tables, the first being a graph showing the Risk Quotient over time (607) containing both companies in question (608). The second graph displays the Risk Quotient by log market cap over the industry (609) with the companies to be compared in a different color with a textual indicator with their names above the companies (610). Finally, the last graph shows the Influence Spend of the companies being compared (611). Company information will be differentiated via having each company displayed in separate colors (608, 610, & 612).

Figure 7:
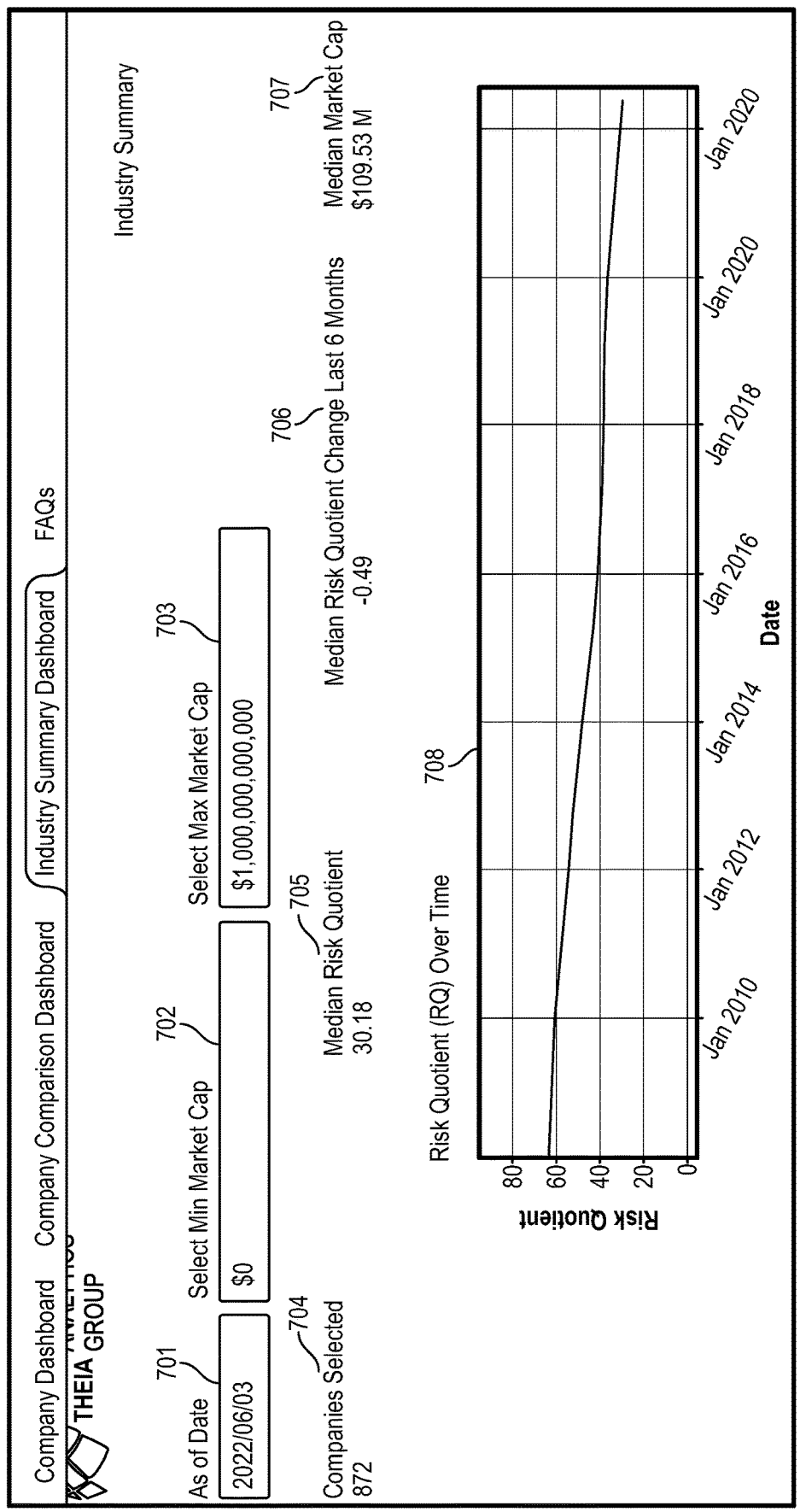
FIG. 7: shows the Industry Summary Dashboard displaying a Risk Quotient over time graph.

FIG. 7 shows the current iteration of the Industry Summary Dashboard. This dashboard allows but is not limited to allowing the date (701), minimum market cap (702), and maximum market cap (703) to be changed. The dashboard then displays the number of companies shown (704), the median Risk Quotient (705), how that has changed over the past six months (706), the median market cap (707), and a graph showing the change in Risk Quotient over time (708).

Figure 8:
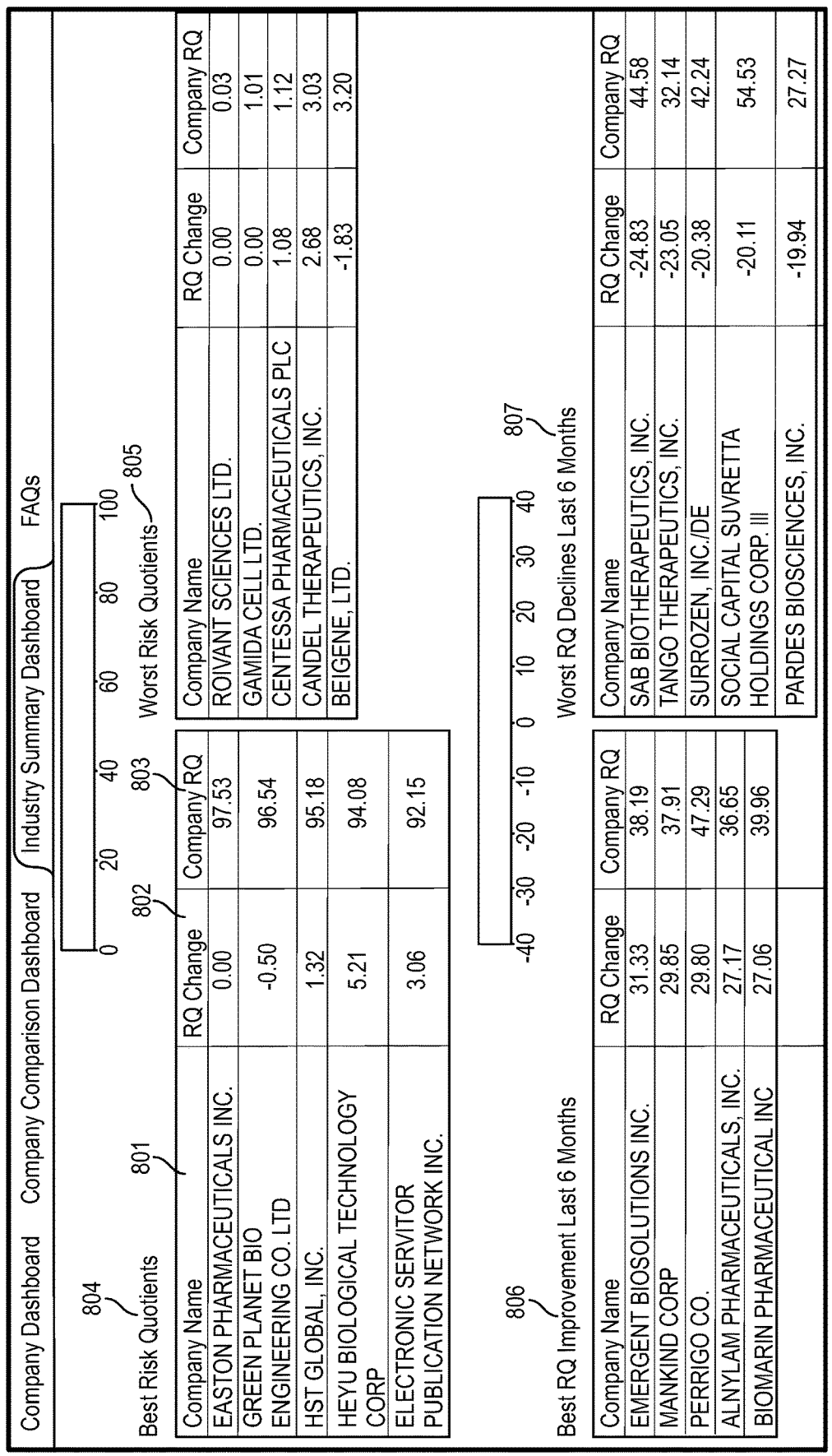
FIG. 8: displays the Industry Summary Dashboard showing companies with notable comparative features in their Risk Quotient within the industry.

FIG. 8 shows four charts, each showing five companies (801) along with the companies' change in Risk Quotient (802) and current Risk Quotient (803). The five companies showed changes dependent on the table, with the first table showing the highest Risk Quotients (804), the second table showing the lowest Risk Quotients (805), the third table showing the highest increases in Risk Quotients (806), and the final table showing the highest decreases in Risk Quotients (807).

In some embodiments, a section for Frequently Asked Questions will be included that will explain to the customer various key details of the dashboard, which has been met with high levels of confusion for other customers who have used the program.

V. Other Exemplary Features

In some embodiments, the RRA portal can either take the form of a website (to be opened in a computer browser), a mobile/tablet browser, or a specific application featured either for computers, phones, or tablets, which will be accessible for people who have bought or are employees of a company who has purchased these services.

In some embodiments, the color coding between green to yellow to red may be based on absolute values, such as being certain colors dependent on if they fall under certain ranges of compliance, and in other embodiments, the coloring may be based on relative values, such as being a red color if the company falls under a certain percentile of governance relative to its industry rivals as compared to a green color if the same company is over a certain percentile of governance compliance.

Some embodiments may include a graph comparing the Risk Quotient compared with other companies in terms of a range of market cap, geography, company size, subindustry, or other means of separating individual companies into groups that can be further analyzed for governance compliance.

Some embodiments may contain a quantitative applied analytics SaaS product designed to provide governance-focused analytics. Some embodiments may help companies design and implement better strategic business plans and provide investors and competitors with an "outside-in" view of the company's business strategy based on their SEC filings.

In some embodiments, inbound data for the algorithm may be SEC filings such as 10-K, 10-Q, 8-K, 13-D/G, etc. In some embodiments, inbound data may also be public filings such as lobbying spending and corporate and PAC spending. However, inbound data may also be any document or report that will aid in the computation of the final score. In some embodiments, the algorithm can assign a different weight for each different document. Specifically, the annual filings can have a higher weight compared to other filings. More specifically, the latest filings may have the highest weight assigned using exponential decay.

For some embodiments, the algorithm may enable users to upload internal documentation from its users to provide a more comprehensive and detailed analysis and create more accurate and actionable insights. The algorithm may utilize internal documents to derive a custom risk assessment score for each company, in addition to any risk metrics derived from the publicly available documentation.

Some embodiments may also offer users the option to include internal company documents along with publicly filed disclosures. An increased number of opt-ins across the sector would enable the software to display publicly available leaderboards, which can be categorized by sector, size, region, and other main attributes of companies.

Some embodiments may offer users the option to not publish their internal documentation but compare it with the larger database to create a leaderboard that is only available to themselves. An increased number of opt-ins would enable the software to perform a normalization of data against a population of similar companies, which can be categorized by sector, size, region, and other main attributes of a company.

For some embodiments, the algorithm may utilize internal documents to derive a custom risk assessment score for each company. The algorithm may then alert users by highlighting the phrases that contribute to their risk score. The algorithm may also match phrases with topics that are material to that company and that specific sector in terms of governance management. The algorithm may also utilize internal documentation to parse and measure regulatory risk on a company and sector basis over time.

In some embodiments, each document is analyzed following a predefined flow. Throughout this flow, the initial document is enriched with an annotation such as metadata. The output of the process may be a document fully annotated with references to the topics and other relevant metadata.

Some embodiments are directed to a processor-based platform usable with an external database and with at least one memory with an Internal Database and computer readable code stored thereon that enables a user of the platform to facilitate the computation of the requested score. The Internal Database will contain data relating to risks that subject companies are exposed to. In some embodiments, the users can elect to upload data in .csv or Excel format. In some embodiments, the delivery of the product can occur as a paper report. In some embodiments, the delivery can be through software that undergoes regular updates to the proprietary scoring assigned to each company.

The software that is being discussed may be offered to clients as a turnkey solution in which the algorithm processes subject documents to derive proprietary risk quotients/scores for each publicly traded company.

In some embodiments, the code enables intermediate steps like enabling a user to input data relevant to the current company risk being exposed. In some embodiments, the algorithm will not need user data and will collect any potentially necessary information by scraping the web for publicly available documents filed to the SEC. It is intended that the code regularly updates scores for every company as there are new filings being continuously posted by public companies that disclose their ES(G) and governance-focused risks.

Some embodiments may contain computational methods that involve a novel algorithm to process the main database and derive a quantitative dynamic risk quotient (TAG "G") for each publicly traded company. The algorithm behind the scoring may or may not use the same algorithm as RRA; however, it is intended that TAG "G" quotients provide a more holistic understanding of governance risk by utilizing a custom distribution of weights from the main database of documents. The distribution of documents in the novel algorithm will fit the risk ecosystem of any given sector to provide a more precise analysis for each publicly traded company.

In some embodiments, the software may utilize pattern analysis and prediction models to extrapolate the direction of change for governance Risk Quotients for the entire market, and companies can use this to get a better sense of changes in the marketplace.

In further embodiments, the software will allow the client to upload documents they plan on using in the future, which will provide immediate governance compliance predictions for the company for when the same documentation is actually uploaded. This can be used to predict the effects of certain decisions upon governance and can further be used as a planning tool based on governance.

SEC filings and other key publicly available documents can be compared between documents that either the company is planning on uploading or has previously uploaded that serve similar, if not identical, purposes. Doing so will allow the company to analyze both documents and determine deviations between the two documents that have produced high levels of risk so key aspects of documents that have been deemed low risk can be co-opted and used to create stronger governance documents for clients.

Documents that have caused recent governance issues that have as of yet not been recorded as governance violations but may prove to cause governance issues in the future can be flagged with key elements from those documents that have caused such governance issues in the first place. After which, these documents can be compared to similar client documents with specialized algorithms to search for flagged elements and issues to determine if client documents have recent and relatively undocumented governance issues that need to be fixed.

In some embodiments, the program may be developed into a machine learning document writer that will be able to compile governance data and produce complete, low-risk governance documents for clients to use. In some embodiments, this program may be a general template for completing such governance documents. In other embodiments, the computer program may be sophisticated enough to automatically take key data points or documents and write custom compliance documents for the client.

In other embodiments, the software may offer companies the option to explore the effects of various changes in governance, for example, but not limited to changes in sizes of governance teams, changes in executive sponsorship, changes in formal training and processes, and changes in planned communication procedures between clients and service providers upon the company. This can be used to present companies with easy access to examinations of how key changes that affect governance would affect their risk scores.

In some embodiments, the users may be notified of phrases that increase their risk score. This notification can occur in many formats. In some embodiments, risky phrases may be color coded to reveal which of these phrases increase the overall risk quotient/score. In some embodiments, risky phrases may be ranked from top to bottom with respect to their contribution to the overall risk quotient/score. In some embodiments, risky phrases may not be ranked but given certain percentage scores with respect to their contributions to the overall risk quotient/score.

In some embodiments, the software/report can be equipped to inform the client separately regarding high-risk phrases that contribute to the overall risk score. In some embodiments, the algorithm may flag high-risk companies by not only the density of their risk statements but also their ability to address those concerns. In some embodiments, the phrases that contribute to the overall risk score may be analyzed further to create actionable insights for the companies/clients. Specifically, in some embodiments, the software/report can leverage its database to identify actions taken by other companies in various industries to address the risks identified. In some embodiments, words and key data points will be colored using various color schemes, most notably green to yellow to red, in order to inform the viewer of the various levels of risk threatening a company aiming for compliance and where the company is on the spectrum.

In some embodiments, the program may search for publicly traded companies with key attributes to determine what aspects of governance may affect stock prices then the program may be adapted to determine how to take advantage of stock changes caused by changing governance circumstances and scores for companies.

In some embodiments, the software may include size, market capitalization, and adjusted risk quotients/scores. Analysis shows a correlation between disclosed risk and market capitalization. As a result, adjusted risk quotients/scores according to market capitalization may be included in some embodiments. Adjusted quotients/scores allow for comparison that is size agnostic.

In some embodiments, the software may be trained along a separate set of documents and word vectors in order to produce a software that can analyze two separate documents for a separate purpose, for example, but not limited to examining various documents from two separate companies in order to determine similarities or differences between the companies' cultures as indicated within the documents to inform a merger or acquisition between the two companies.

In some embodiments, the software may be trained along a separate set of documents and word vectors to create a software that can analyze various documents to determine key themes in strategy and in doing so find if internal strategy has been changing at a company in order to better analyze the effects of such transformation within a business.

In some embodiments, the software may be trained along a separate set of documents and word vectors to make a software that can find key themes within a corporate culture and then compare the culture with other internal documents of the same company at a different time or a different internal branch in the company to find key similarities and differences within the same company.

In some embodiments, the software may alert a company of a potential change in the risk score of another company found from public data on the company to inform decisions over key business negotiations or mergers and acquisition work and gain an advantage in these proceedings by being able to push or avoid an issue that has not yet become apparent to the other company.

In some embodiments, the software may organize broad business intelligence built around words and compare it with another set of criteria to determine the relevance of the document in addressing key issues based on the set criteria the company has, is, or may soon be facing.

In some embodiments, the software may be able to estimate expected costs and damages caused by found degrees of risk in governance. In further embodiments, the software may also be able to run a cost-benefit analysis to determine the expected cost of fixing such issues and the expected loss from not fixing the issues.

In some embodiments, the software may be equipped with certain alert abilities for its clients. In some embodiments, the software may alert the users when there is a significant change in the score of their own company or other companies that may elect to follow or pay to subscribe. In some embodiments, the software may alert the users when there is an increase above a certain score threshold or drops below a certain score threshold. Again, these alerts can be for the user's own company or other companies that may elect to follow or subscribe.

In some embodiments, the software may be equipped with alert abilities for its clients regarding industry-wide regulations or risks that are specific to that company.

The algorithm is programmed with base risk computed for all eleven (11) sectors and seventy-seven (77) industries. In some embodiments, users may be alerted beforehand when there is a pattern analysis computed by the algorithm to notify the client about the risks that they may be exposed to in the future. In some embodiments, users may be alerted at the time of regulation or other sudden events that may occur which carry certain risk weight related to the sector or industry that the user operates in. In some embodiments, these alerts can be for the user's own company or other companies that may elect to follow or subscribe.

In addition to being an external assurance, described embodiments may also benefit by keeping a large database of companies' filings and their subsequent actions to compute pattern analysis to inform companies with actionable insights to mitigate the risks highlighted by the proprietary algorithm. Some embodiments may also utilize regulatory agency historical behavior, federal register, and pattern analysis to predict regulatory changes and inform companies accordingly.

In some embodiments, the software may utilize pattern analysis to identify clients early on when risk phrases appear for the first time in their SEC filings. The software may identify historical or recent examples to illustrate the timeline of how certain phrases may evolve into higher risks in certain industries and how to overcome them in a timely fashion.

Some of the preferred embodiments (identified here as MergerRanx) may utilize pattern analysis by making use of historical outcomes, for examples from the Department of Justice and The Federal Trade Commission, to identify the quantitative probability of approval for any potential deal that may occur between a plurality of companies.

In some embodiments, the software may include time-adjusted scores that correspond to the overall regulatory environment at a given point in time. While gross risk may increase or decrease over a period of time, the result may be from overall market trends rather than company-specific action or inaction. Adjusted scores may allow stakeholders to differentiate between market-wide risk increases versus company-specific risk increases.

The software may also be deconstructed into several different components, with each component possessing different features to be presented to users instead of a turnkey solution.

Some embodiments may be offered as a separate subscription that may contain features that are in the software or may be separate features that can be derived utilizing the algorithms.

Users may elect to subscribe to receive hot topics that are derived from the database of filings that are relevant to each sector or sub-industry. Users may also elect to receive insights that are driven by the algorithm utilizing the large database at hand. These insights may be sector and industry-specific and may utilize pattern analysis that takes advantage of the historical data and identify which issues are resolved within a specific timeframe by performing specific actions.

Insights and hot topics may be delivered to the client in the form of a software report, software notification, email, or via another digital format. Insights and hot topics will serve the purpose of providing a comprehensive risk analysis of the sector or the subindustry that the client is operating in.

The software may also be equipped with a regularly scheduled newsletter that provides advice on hot topics in governance risk for each sector and sub-industry. Users may elect to subscribe to the newsletter. The software may also be equipped with a tool that further customizes the scheduled newsletter with respect to the company and the hot topics that are most relevant to their business operations. This feature may serve as a service tool that the company can further customize to their users' requests to become a fully customizable advisory service providing insights for risk management departments of publicly traded companies. The newsletter and customized advisory letters may utilize pattern analysis to derive hot topics from publicly filed disclosures. This feature may also utilize basic concepts of Natural Language Processing to create reports automatically and on user request. These reports may be further customized to include users' company logo, users' preference of language, and users' preferred method of delivery and format.

Users may also elect to subscribe to the large main database that the algorithm utilizes to perform their own analytics. This feature would give the companies the option to analyze their risk management in real-time and determine how their risk management has progressed or regressed over time. The company may further deconstruct the main components of the software to expand its user base and effectively address the needs of customers in the risk management landscape in a comprehensive manner.

In some embodiments, the software may be equipped with certain comparison functionalities allowing users to benchmark their risk quotients/scores with other companies in their sector. The software may list top companies relevant for comparison while factoring in subindustries, geography, company size, company market cap, and company age. The software may also offer the option for users to select companies to compare with their own company. In some embodiments, the comparison tool can be utilized to benchmark risk performance in real-time, but also any desired time in the past dataset to obtain a comprehensive view of the landscape and how it has reshaped over time. In some embodiments, a comparison tool may also be equipped with features that identify possible M&A targets for each company and the probability of a deal being approved from a regulatory standpoint. This feature would allow the users to obtain a comprehensive view of the sector landscape and purposefully align their governance risk management with respect to their M&A targets. In some embodiments, the software may be equipped with certain integration features with government agencies such as the SEC or the U.S. Senate.

In some embodiments, the algorithm may highlight high-risk companies by not only the density of their risk statements but also their ability to address those concerns. So, it is particularly of interest to obtain these filings and enable constant data sharing between the RRA platform and government agencies.

In some embodiments, the software may obtain data points such as lobbying spending, corporate spending, PAC spending, spending to mitigate risks enclosed in annual filings, and similar data to calculate risk quotients/scores in correlation to the company's mitigation activities.

In some embodiments, the software may flag increased lobbying spending in a short amount of time as a risky activity. In some embodiments, the software may flag no disclosed spending to counter exposed risks as a risky activity.

In some embodiments, the software may analyze irregular filings that indicate specific actions, mergers, acquisitions, or other activities that correspond to specific disclosed risk. The software may evaluate both the causes and effects of the actions as it pertains to the company's governance risk.

Some embodiments may allow data being used by the program to be downloaded in a .csv or Excel format to have internal tests run on such data and allow the data to be used in more versatile manners up to client discretion.

Some embodiments may utilize external documents created by a third party, for example, but not exclusively: an SEC report on governance within a sector, to create a separate analysis that can be used to inform, modify, or accompany the original report created for a company.

In some embodiments, the software may determine similar cases of risky governance compliance and may connect companies with similar issues in governance compliance so they can collaborate in finding solutions and workarounds to the issues.

In some embodiments, the software may offer to create a Smart Contract that will automatically execute between companies, which will allow them to make automatically executing agreements with one another to try and help them address key issues that they are facing in governance.

In some embodiments, the software may analyze lobbying spending in a short amount of time done by companies to determine what such spending is aiming to accomplish and can supply clients with resources to better understand the risk that is being posed, who will be affected if such governance changes are made, and how to remain in compliance should such regulations take effect.

In some embodiments, the software is intended to receive publicly disclosed documentation on a continuous basis, therefore, the risk scores may be prone to be updated on a continuous basis as well. The dashboard may be equipped to inform users what specific change in the regulatory landscape caused the change in their risk quotient/score. The dashboard may also be equipped to inform users if another company's filings have altered their risk quotient/score, along with the key phrases that contributed to the change in their risk quotient/score. The dashboard may also be equipped with other statistical information such as the average risk quotient/score of the sector, changes in average risk quotient/score of the sector, median market cap, and total Influence Spend in the last election cycle In some embodiments, two separate report types may be established, pool A, which can consist of annual financial reports, SEC filings, and integrated reports, and pool B, which can consist of sustainability reports. Should A be higher than B, the total score can be A, whereas if B is higher than A, then the total score can be the larger between the mean of A and B and A.

Sentences may have hits dependent on the number of topics covered. This may be used to form a Hit % that can be used to track over time the evolution of this proportion, and across entities or companies, the same type of document can be compared from one to another.

A potential advantage of some embodiments of the presently disclosed subject matter is that relevant topics, including text, can be accurately identified in specific fields. This may improve data processing technology and lead to a superior classification of documents and better searching or analysis of those documents.

The generation of a plurality of topics may occur, at least in part, automatically. The topics generated will be from obtaining data for the organization from a plurality of sources, and by processing the data via an ontological process, relevant topics may be generated, and weights applied to each topic.

Relevant regulatory information may include a plurality of regulatory initiatives, and the following may be displayed to a user: title name, description, degree of binding force, relevant topics and classifications, date of entry into force, date of the latest update on the initiative, text on the evolution of the initiative, issuer's name and type, the language of the original text, and sector of application of the given legal instrument and sources.

In some embodiments, the text may be tokenized, and a Gazetteer may be matched against created tokens. The Gazetteer is a series of list files extracted. It defines a multi-level hierarchical structure such as high to low, categories, buckets, topics, and terms. Terms may be indicators of the topic's presence in the document and annotated as such.

In some embodiments, a methodology of processing data made of text may include extracting the text, parsing the extracted text, tokenizing the parsed text, and matching the tokenized text against terms in an ontological framework that uses a plurality of categories; topics; terms; and rules, based on the matching classifying one or multiple parts of the data into a plurality of categories, identifying topics within the data from the plurality of topics, based on associations within the data from the determined rules and topics identifying the relevance of identified topics, and annotating the relevant parts of the documents based on importance.

In some embodiments, a communications module may be configured to communicate with one or more of the plurality of sources to retrieve data.

In some embodiments, a monitoring module may be constructed for each identified regulatory information; and it may monitor the information at the source and provide regular updates on the status of the regulatory information.

The identified regulatory information may be processed to identify topics within the regulatory information; an ontological methodology may be used to process the identified regulatory information. The identified regulatory information may be processed to identify the relevance of topics within the regulatory information. The identified topics may be displayed to a user.

Regulatory information may be categorized as directly relevant if it is about the country the organization's headquarters is located, indirectly relevant if in a country with a market served by the organization or where a supplier is located, or globally relevant where the regulatory information is not restricted to a specific country.

A potential advantage of some embodiments of the presently disclosed subject matter is the user does not need to understand the nuances of local, national, or international law to locate regulatory information relevant to their organization.

In one embodiment, the method may include a yet further step of generating proportional importance for a topic within the data or across a plurality of data. The proportional importance may be measured against other entities or against earlier or later generated data to provide a comparison within a cluster of entities or across time, respectively.

What is claimed is:

1. A computer-implemented method for a machine learning document writer for governance risk analysis and scoring of documents relating to companies in an industry, the documents containing raw text including words pertaining to governance, the method being useable with a seed dictionary containing a list of words exhibiting risk, the method comprising:

extracting the raw text from the documents;
transforming individual words from the raw text into nodes and edges that create networks of nodes and edges, one of the networks of nodes and edges pertaining to each document;
analyzing, in the documents, certain words pertaining to governance and graphing the words to the network of nodes and edges;
assessing, to determine a semantic and syntactic relationship, the certain words in the network using Natural Language Processing (NLP) and at least one of mathematics and graph theory;
determining a semantic score for each node using the number and weight of edges surrounding each node;
determining a saliency score based on at least a word's reoccurrence in the raw text;
determining a risk sentiment score determined by the seed dictionary with the list of words exhibiting risk, the score being affected by the connectedness of the document to the words exhibiting risk;
determining a node score for a certain node based on the semantic score, the saliency score, and the risk sentiment score; and
iterating at least one of the semantic score, the saliency score, the risk sentiment score, and the node score automatically every time a new filing is uploaded, wherein
the NLP adapts dynamically based on document updates and regulatory changes to automatically reclassify and iterate risk assessments, and wherein model retraining updates the model to reflect the most up-to-date data without modifying existing parameters.

2. The method of claim 1, wherein the raw text includes words and sentences.

3. The method of claim 2, further comprising:
removing stock words from the raw text;
lemmatizing at least one of the words and sentences to remove proper nouns, remove punctuation, and correct spelling; and
separating sentences from one another.

4. The method of claim 1, wherein the method is useable on the internet, and the raw text from filings pertain to public information available on the internet.

5. The method of claim 1, wherein the raw text from filings pertain to public SEC filings.

6. The method of claim 1, wherein the scores are reflected to contextualize risk on a scale.

7. The method of claim 1, wherein the method includes at least one client, and sending at least one of the semantic score, the saliency score, the risk sentiment score, and the node score to the at least one client.

8. The method of claim 1, wherein the nodes are expressed as vectors using Law2Vec analysis to choose a vector that represents a word portrayed in a specific node.

9. The method of claim 1, wherein the semantic score is calculated using a modified version of PageRank.

10. A computer-implemented method for a machine learning document writer for governance risk analysis and scoring of documents relating to companies in an industry, the documents containing raw text including words pertaining to governance, the method being useable with a seed dictionary containing a list of words exhibiting risk, the method comprising:

transforming individual words from the raw text into nodes and edges that create networks of nodes and edges, one of the networks of nodes and edges pertaining to each document;
analyzing, in the documents, certain words pertaining to governance and graphing the words to the network of nodes and edges;
assessing, to determine a semantic and syntactic relationship, the certain words in the network using Natural Language Processing (NLP) and at least one of mathematics and graph theory;
determining a saliency score based on at least a word's reoccurrence in the raw text;
determining a risk sentiment score determined by the seed dictionary with the list of words exhibiting risk, the score being affected by the connectedness of the document to the words exhibiting risk;
determining a risk quotient score for a given node based on the saliency score and the risk sentiment score; and
iterating at least one of the semantic score, the saliency score, and the risk quotient score automatically every time a new filing is uploaded, wherein
the NLP adapts dynamically based on document updates and regulatory changes to automatically reclassify and iterate risk assessments, and wherein model retraining updates the model to reflect the most up-to-date data without modifying existing parameters.

11. The method of claim 10, wherein the raw text includes words and sentences.

12. The method of claim 10, further comprising:
removing stock words from the raw text;
lemmatizing at least one of the words and sentences to remove proper nouns, remove punctuation, and correct spelling; and
separating sentences from one another.

13. The method of claim 10, wherein the raw text from filings pertain to public SEC filings.

14. The method of claim 10, wherein a sentence level risk score is determined based on the risk score of the words in the sentence.

15. The method of claim 14, wherein a document level risk score is determined based on the risk score of the sentences in the document.

16. The method of claim 15, wherein the steps are repeated until every filing for a company has been given a measure of governance risk.

17. The method of claim 15, wherein a company risk quotient is formed using the risk quotients of the documents pertaining to that company.

18. The method of claim 16, wherein a sector risk quotient is formed using the risk quotients of individual companies pertaining to that sector.

19. The method of claim 17, wherein a modified exponential decay algorithm is used to weigh the documents by relevance according to time.

* * * * *